US012436995B1

United States Patent
Gong et al.

(10) Patent No.: US 12,436,995 B1
(45) Date of Patent: Oct. 7, 2025

(54) INTERACTIVE USER ASSISTANCE SYSTEM WITH RICH MULTIMODAL CONTENT EXPERIENCE

(71) Applicant: Dell Products L.P., Round Rock, TX (US)

(72) Inventors: Min Gong, Shanghai (CN); Zijia Wang, London (GB); Deepaganesh Paulraj, Bangalore (IN)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 18/758,095

(22) Filed: Jun. 28, 2024

(51) Int. Cl.
| G06F 16/70 | (2019.01) |
| G06F 16/73 | (2019.01) |
| G06F 16/90 | (2019.01) |
| G06F 16/955 | (2019.01) |

(52) U.S. Cl.
CPC .......... G06F 16/73 (2019.01); G06F 16/9558 (2019.01)

(58) Field of Classification Search
CPC .............................. G06F 16/73; G06F 16/9558
See application file for complete search history.

(56) References Cited

U.S. PATENT DOCUMENTS

| 8,538,897 | B2 | 9/2013 | Han et al. |
| 9,852,646 | B2 * | 12/2017 | Kozloski ............ G09B 5/02 |
| 10,217,058 | B2 * | 2/2019 | Gamon ............... G06N 20/00 |
| 10,572,329 | B2 | 2/2020 | Harutyunyan et al. |
| 10,616,314 | B1 | 4/2020 | Plenderleith et al. |
| 10,740,793 | B1 | 8/2020 | Sussman et al. |
| 10,776,196 | B2 | 9/2020 | Ohana et al. |
| 10,853,867 | B1 | 12/2020 | Bulusu et al. |
| 11,513,930 | B2 | 11/2022 | Chan et al. |
| 11,720,940 | B2 | 8/2023 | Lakshminarayan et al. |
| 11,734,102 | B1 | 8/2023 | Wang et al. |
| 11,748,185 | B2 | 9/2023 | Xu et al. |

(Continued)

FOREIGN PATENT DOCUMENTS

| CN | 108280168 A | 7/2018 |
| CN | 111476371 A | 7/2020 |

(Continued)

OTHER PUBLICATIONS

Kevin Dela Rosa, Video Enriched Retrieval Augmented Generation Using Aligned Video Captions, May 27, 2024 [retrieved online Mar. 6, 2025]. Retrieved from the Internet: https://doi.org/10.48550/arXiv.2405.17706 (Year: 2024).*

(Continued)

*Primary Examiner* — Kristopher Andersen
(74) *Attorney, Agent, or Firm* — WOMBLE BOND DICKINSON (US) LLP (57) ABSTRACT

Methods and systems for managing an interactive user assistance system that provides a rich multimodal content experience for a user are disclosed. In particular, hyperlinks may be included in responses generated for the user's questions to the system. These hyperlinks may take the user to one or more videos or video clips containing content that would assist the user in better resolving the user's questions. The videos or video clips may be stored in a hierarchically managed video clip pool that provides efficient retrieval and association with related content for enhancing the user's access to such multimodal content.

20 Claims, 7 Drawing Sheets

(56) References Cited

U.S. PATENT DOCUMENTS

| | | |
|---|---|---|
| 11,909,836 B2 | 2/2024 | Wulf et al. |
| 12,061,970 B1 | 8/2024 | Lo et al. |
| 2004/0125124 A1* | 7/2004 | Kim .................. G06F 16/7847 |
| 2009/0113248 A1 | 4/2009 | Bock et al. |
| 2009/0216910 A1 | 8/2009 | Duchesneau |
| 2010/0257058 A1 | 10/2010 | Karidi et al. |
| 2010/0318856 A1 | 12/2010 | Yoshida |
| 2013/0041748 A1 | 2/2013 | Hsiao et al. |
| 2013/0198240 A1 | 8/2013 | Ameri-Yahia et al. |
| 2014/0310222 A1 | 10/2014 | Davlos et al. |
| 2015/0161241 A1* | 6/2015 | Haggar .................. G06Q 10/10 707/723 |
| 2015/0227838 A1 | 8/2015 | Wang et al. |
| 2015/0288557 A1 | 10/2015 | Gates et al. |
| 2018/0205645 A1 | 7/2018 | Bays |
| 2019/0095313 A1 | 3/2019 | Xu et al. |
| 2019/0129785 A1 | 5/2019 | Liu et al. |
| 2020/0026590 A1 | 1/2020 | Lopez et al. |
| 2021/0027205 A1 | 1/2021 | Sevakula et al. |
| 2021/0241141 A1 | 8/2021 | Dugger et al. |
| 2021/0287109 A1 | 9/2021 | Cmielowski et al. |
| 2022/0100187 A1 | 3/2022 | Isik et al. |
| 2022/0283890 A1 | 9/2022 | Chopra et al. |
| 2022/0358005 A1 | 11/2022 | Saha et al. |
| 2022/0417078 A1 | 12/2022 | Matsuo et al. |
| 2023/0016199 A1 | 1/2023 | Jividen et al. |
| 2024/0028955 A1 | 1/2024 | Harutyunyan et al. |
| 2024/168835 A1 | 5/2024 | Wang et al. |
| 2025/0086211 A1 | 3/2025 | Bolcer et al. |

FOREIGN PATENT DOCUMENTS

| | | |
|---|---|---|
| CN | 112541806 A | 3/2021 |
| EP | 4235505 A1 | 8/2023 |

OTHER PUBLICATIONS

Zhao, Wayne Xin, et al., "A Survey of Large Language Models," arXiv preprint arXiv:2303.18223 (2023) (97 Pages).

Kaddour, Jean, et al., "Challenges and Applications of Large Language Models," arXiv preprint arXiv:2307.10169 (2023) (72 Pages).

Naveed, Humza, et al., "A Comprehensive Overview of Large Language Models," arXiv preprint arXiv:2307.06435 (2023) (35 Pages).

Boffa, Matteo, et al., "LogPrécis: Unleashing Language Models for Automated Shell Log Analysi," arXiv preprint arXiv:2307.08309 (2023) (17 Pages).

Chen, Yinfang, et al., "Empowering Practical Root Cause Analysis by Large Language Models for Cloud Incidents," arXiv preprint arXiv:2305.15778 (2023) (15 Pages).

Lee, Yukyung, et al., "LAnoBERT : System Log Anomaly Detection based on BERT Masked Language Model," Applied Soft Computing 146 (2023): 110689 (18 Pages).

Pfeiffer, Jonas, et al. "Adapterfusion: Non-destructive task composition for transfer learning." arXiv preprint arXiv:2005.00247 (2020) (17 Pages).

Houlsby, Neil, et al. "Parameter-efficient transfer learning for NLP." International conference on machine learning. PMLR, 2019 (13 Pages).

* cited by examiner

INTERACTIVE USER ASSISTANCE SYSTEM WITH RICH MULTIMODAL CONTENT EXPERIENCE

FIELD

Embodiments disclosed herein relate generally to user assistance systems. More particularly, embodiments disclosed herein relate to systems and methods managing user assistance systems to provide an interactive and rich multimodal content experience for users of the system.

BACKGROUND

Computing devices may provide computer-implemented services. The computer-implemented services may be used by users of the computing devices and/or devices operably connected to the computing devices. The computer-implemented services may be performed with hardware components such as processors, memory modules, storage devices, and communication devices. The operation of these components may impact the performance of the computer-implemented services.

BRIEF DESCRIPTION OF THE DRAWINGS

Embodiments disclosed herein are illustrated by way of example and not limitation in the figures of the accompanying drawings in which like references indicate similar elements.

DETAILED DESCRIPTION

Various embodiments will be described with reference to details discussed below, and the accompanying drawings will illustrate the various embodiments. The following description and drawings are illustrative and are not to be construed as limiting. Numerous specific details are described to provide a thorough understanding of various embodiments. However, in certain instances, well-known or conventional details are not described in order to provide a concise discussion of embodiments disclosed herein.

Reference in the specification to "one embodiment" or "an embodiment" means that a particular feature, structure, or characteristic described in conjunction with the embodiment can be included in at least one embodiment. The appearances of the phrases "in one embodiment" and "an embodiment" in various places in the specification do not necessarily all refer to the same embodiment.

References to an "operable connection" or "operably connected" means that a particular device is able to communicate with one or more other devices. The devices themselves may be directly connected to one another or may be indirectly connected to one another through any number of intermediary devices, such as in a network topology.

In general, embodiments disclosed herein relate to methods and systems for managing an interactive user assistance system that is configured to provide a rich multimodal content experience for a user. In particular, the interactive user assistance system may employ a combination of various machine learning/artificial intelligence (ML/AI) techniques (e.g., large language model (LLM) based content generation techniques, Retrieval-Augmented Generation (RAG) based techniques, or the like) to generate one or more responses to a user's input (e.g., a question, statement, comment, problem, or the like).

To improve the response provided to the user, the interactive user assistance system of embodiments disclosed herein may employ semantic mapping (or other similar) techniques to select one or more videos (or video clips) based on referenceable terms identified in the response. Access to these selected videos (or video clips) may be provided to the user via hyperlinks embedded into the response (e.g., replacing one or more parts of the response with a hyperlink to the videos (or video clips)). The selected videos may include content that will enhance the content of the response.

For example, a user interacting with the interactive user assistance system may input a question regarding changing out a computer processing unit (CPU) of a computer. The response generated by the interactive user assistance system of embodiments disclosed herein may include a step-by-step tutorial of how this can be done. Each of the steps in the step-by-step tutorial may include a function (e.g., a hyperlink) that provides the user to one or more videos (or video clips) showing a live demonstration of each of the steps.

To prevent/avoid mismatching between user inputs and videos and long wait-times for finding/identifying the necessary videos typically experienced in conventional user assistance systems and to provide improved precision in the selection of the video (or video clips), the videos (or video clips) may be stored in a hierarchically managed video clip pool, which will be discussed in more detail below in reference to FIGS. 2A-2B. Such a hierarchically managed video clip pool may provide improved retrieval and association of these videos (or video clips) when they are being selected to be added to the enhance the response.

Such improved retrieval and association may also advantageously save the amount of computing resources (e.g., from the limited computing resource pool of a computing device) needed to find and select the most relevant video (or video clips) that would best enhance the response provided to the user, which directly leads to improved functionality (e.g., computer functionality) of the computing device (e.g., see FIG. 4 for an example computing device) configured to host and provide the services of the interactive user assistance system of embodiments disclosed herein.

Thus, an interactive user assistance system that not only improves the user experience being provided but also improves the functionality of the computing device hosting the interactive user assistance system may be obtained using the details of embodiments disclosed herein discussed below in reference to FIGS. 1-3B.

In an embodiment, a computer-implemented method for managing an interactive user assistance system that provides a rich multimodal content experience for a user is provided. The method may include: obtaining an input from the user; generating a response to the input using one or more machine learning models; identifying one or more referenceable terms within the response using the response and a video hierarchy and semantic representation database, the video hierarchy and semantic representation database comprises a hierarchically managed video clip pool; replacing each of the one or more referenceable terms within the response with a hyperlink to a video, among videos stored in the hierarchically managed video clip pool, to obtain an enhanced response; and providing the enhanced response to the user.

The video hierarchy and semantic representation database may include, as part of the hierarchically managed video clip pool: the videos and video clips of the videos, the videos and the video clips are grouped into one or more video hierarchies that indicate a hierarchical association between each of the videos and the video clips, and a plurality of semantic representations of the video clips, wherein each of the plurality of semantic representations is associated with a single one of the video clips.

The video hierarchy and semantic representation database further comprises a semantic vector space in which the plurality of semantic representations is stored.

The one or more machine learning models comprise a large language model (LLM) utilizing a retrieval-augmented generation (RAG) framework.

The hierarchically managed video clip pool may be generated by: obtaining the videos; and for a first video among the videos: clipping the first video into first video clips; creating a first video hierarchy, of the one or more video hierarchies, for the first video and the first video clips; generating a semantic representation, of the plurality of semantic representations, for each of the first video and the first video clips; storing the semantic representation of each of the first video and the first video clips into the semantic vector space; and storing the semantic vector space and information associated with the first video hierarchy into the video hierarchy and semantic representation database as part of the hierarchically managed video clip pool.

The semantic representation of each of the first video and the first video clips are generated using multimodal content embedding techniques.

The semantic vector space comprises areas associated with each of the one or more referenceable terms, and the semantic representation of each of the first video and the first video clips are stored in respective ones of the areas of the semantic vector space based on a level of similarity between the semantic representation and the one or more referenceable terms.

The video associated with the hyperlink in the enhanced response is one of the first video or the first video clips, and upon detecting that the user has accessed the one of the first video or the first video clips using the hyperlink, providing the user with information regarding the first video hierarchy to grant the user access to any ones of the first video and the first video clips within the first video hierarchy.

The input comprises a question and the video comprises content for assisting the user resolve the question.

The question is associated with an error of a data processing system, and the content comprises step-by-step tutorials for resolving the error.

A non-transitory media may include instructions that when executed by a processor cause the computer-implemented method to be performed.

A data processing system (e.g., a backend component orchestrator) may include the non-transitory media and a processor, and may perform the computer-implemented method when the computer instructions are executed by the processor.

Figure 1:
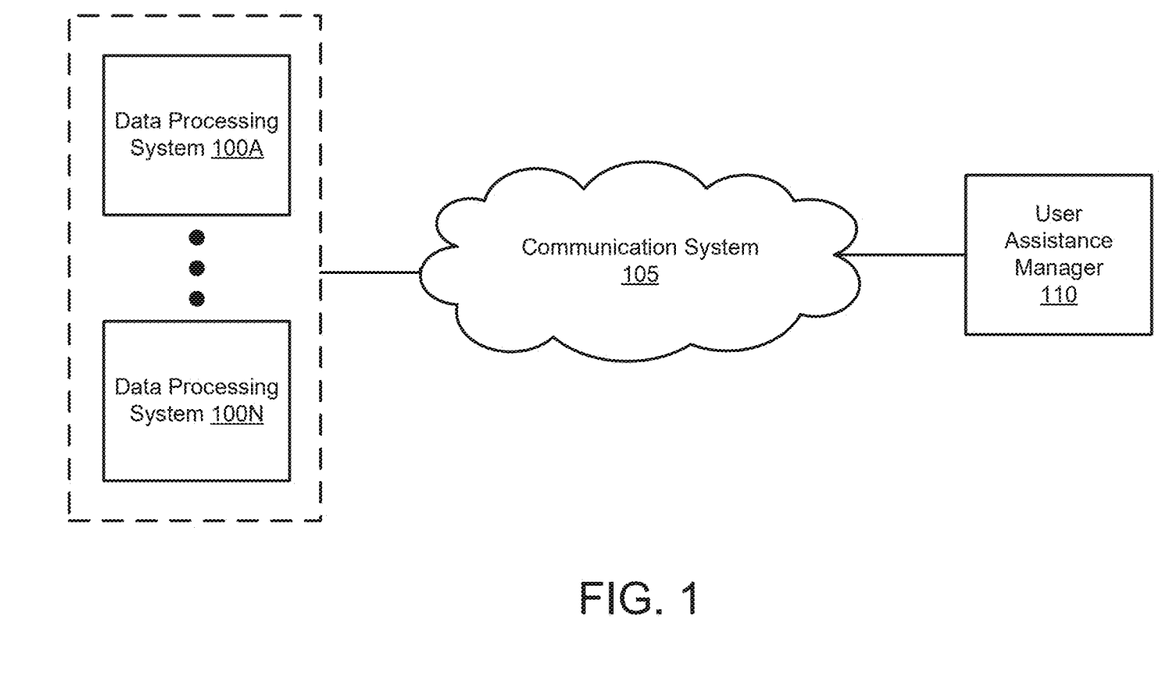
FIG. 1 shows a block diagram illustrating a system in accordance with one or more embodiments.

Turning to FIG. 1, a block diagram illustrating a system in accordance with an embodiment is shown. The system shown in FIG. 1 may provide computer-implemented services using one or more data processing systems (e.g., data processing systems 100A-100N) and a user assistance manager (e.g., user assistance manager 110).

In embodiments, data processing systems 100A-100N may include any number of computing devices that provide computer-implemented services for a user. For example, data processing systems 100A-100N may include one or more computing devices that may independently and/or cooperatively provide the computer-implemented services to users and/or other computing devices operably connected to data processing systems 100A-100N. More specifically, each of the data processing systems 100A-100N may be, but is not limited to, a user's work or personal computer.

The computer-implemented services may include any type and quantity of services including, for example, database services, instant messaging services, video conferencing services, prediction and/or inference generation services, machine learning (ML)/artificial intelligence (AI) related services, data science related services, etc. Different systems may provide similar and/or different computer-implemented services. To provide the computer-implemented services, data processing systems 100A-100N may host applications that provide these (and/or other) computer-implemented services. The applications may be hosted by one or more of data processing systems 100A-100N. These applications may utilize (e.g., invoke use of, or the like) one or more backend components (e.g., models, policies, backend applications, data and infrastructures, or the like) and/or other computing devices to provide the computer-implemented services.

One of the applications hosted by the data processing systems 100A-100N may be an interactive user assistance system of one or more embodiments. In one example, the interactive user assistance system may be a chatbot used for triage and/or troubleshooting services. Other forms of interactive user assistance systems (e.g., ChatGPT, automated messaging systems, virtual assistants, or the like) may also be used without departing from the scope of embodiments herein.

Such interactive user assistance system hosted by the data processing systems 100A-100N may utilize (e.g., invoke use of, or the like) the capabilities and functions of the user assistance manager 110. For example, the user assistance manager 110 may host all of the hardware and/or software (e.g., algorithms, databases, data, or the like) necessary to provide the functionalities, capabilities, and/or services (e.g., the computer-implemented services) of the interactive user assistance system hosted on the data processing system 100A. More specifically, the user assistance manager 110, in one example, may be a server (local or remote) that is configured to include all of the components (hardware and/or software) required to provide the functionalities, capabilities, and/or services (e.g., the computer-implemented services) of the interactive user assistance system to one or more users of the data processing systems 100A-100N.

Alternatively, in another example of one or more embodiments, the components (hardware and/or software) required to provide the functionalities, capabilities, and/or services (e.g., the computer-implemented services) of the interactive user assistance system the user assistance manager 110 may be built into (e.g., internally as part of) each of the data processing systems 100A-100N.

Furthermore, any or all of the data processing systems 100A-100N and the user assistance manager 110 may be configured to include a graphical user interface (GUI) for users of these devices/systems to interact with the interactive user assistance system. Said another way, when providing their functionality, any of the data processing systems 100A-

100N and/or user assistance manager 110 may perform all, or a portion, of the method and/or actions shown in FIGS. 2A-3B.

Each of the data processing systems 100A-100N and the user assistance manager 110 may be implemented using a computing device such as a host or server, a personal computer (e.g., desktops, laptops, and tablets), a "thin" client, a personal digital assistant (PDA), a Web enabled appliance, or a mobile phone (e.g., Smartphone), an embedded system, local controllers, and/or any other type of data processing device or system. For additional details regarding computing devices, refer to FIG. 4.

Any of the components illustrated in FIG. 1 may be operably connected to each other (and/or components not illustrated) with a communication system 105. In an embodiment, communication system 105 may include one or more networks that facilitate communication between any number of components. The networks may include wired networks and/or wireless networks (e.g., and/or the Internet). The networks may operate in accordance with any number and types of communication protocols (e.g., such as the internet protocol).

While illustrated in FIG. 1 as included a limited number of specific components, a system in accordance with an embodiment may include fewer, additional, and/or different components than those illustrated therein.

Figure 2A:
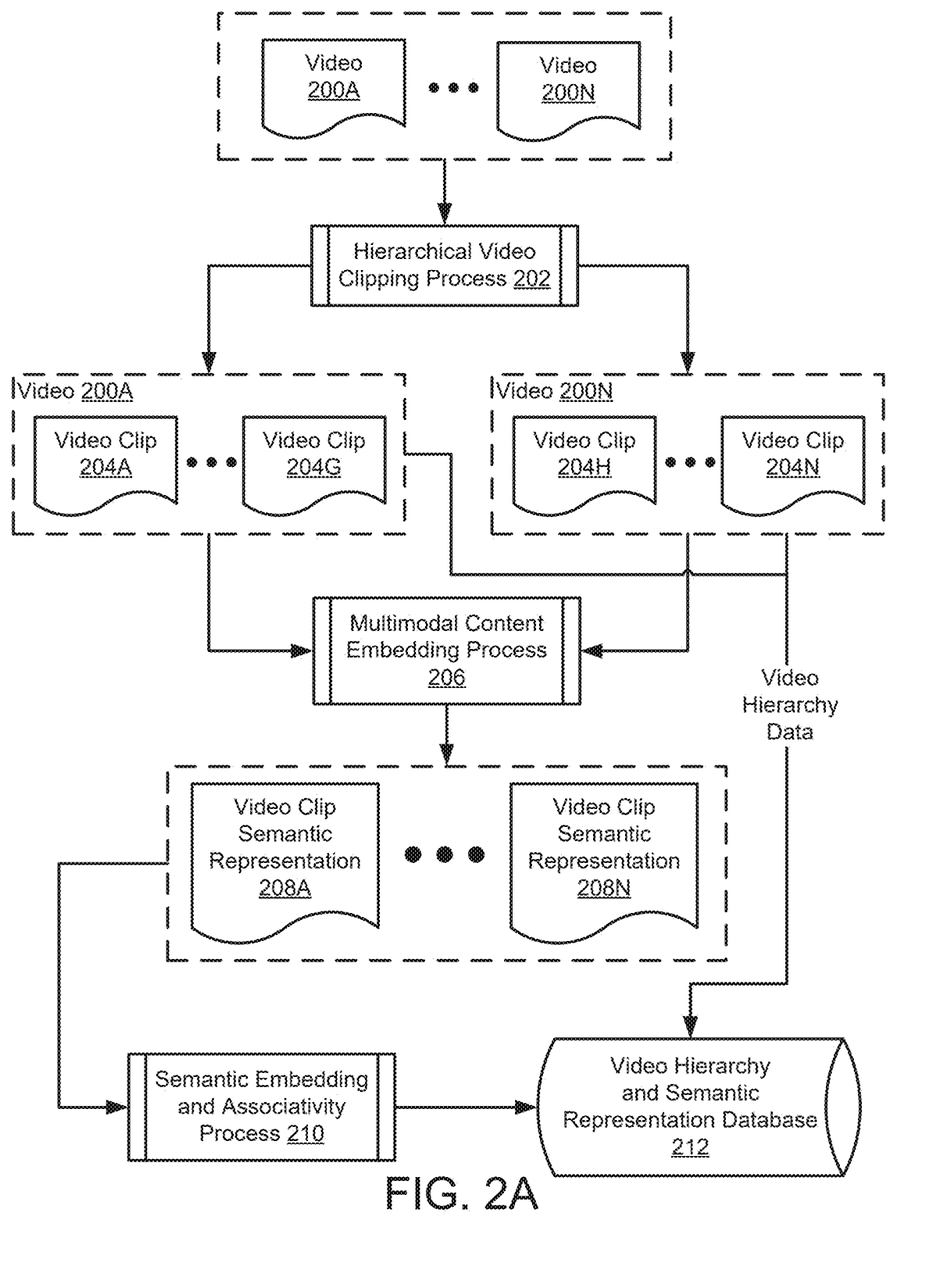
FIGS. 2A-2C show data flow diagrams and implementation examples in accordance with one or more embodiments.
Figure 2B:
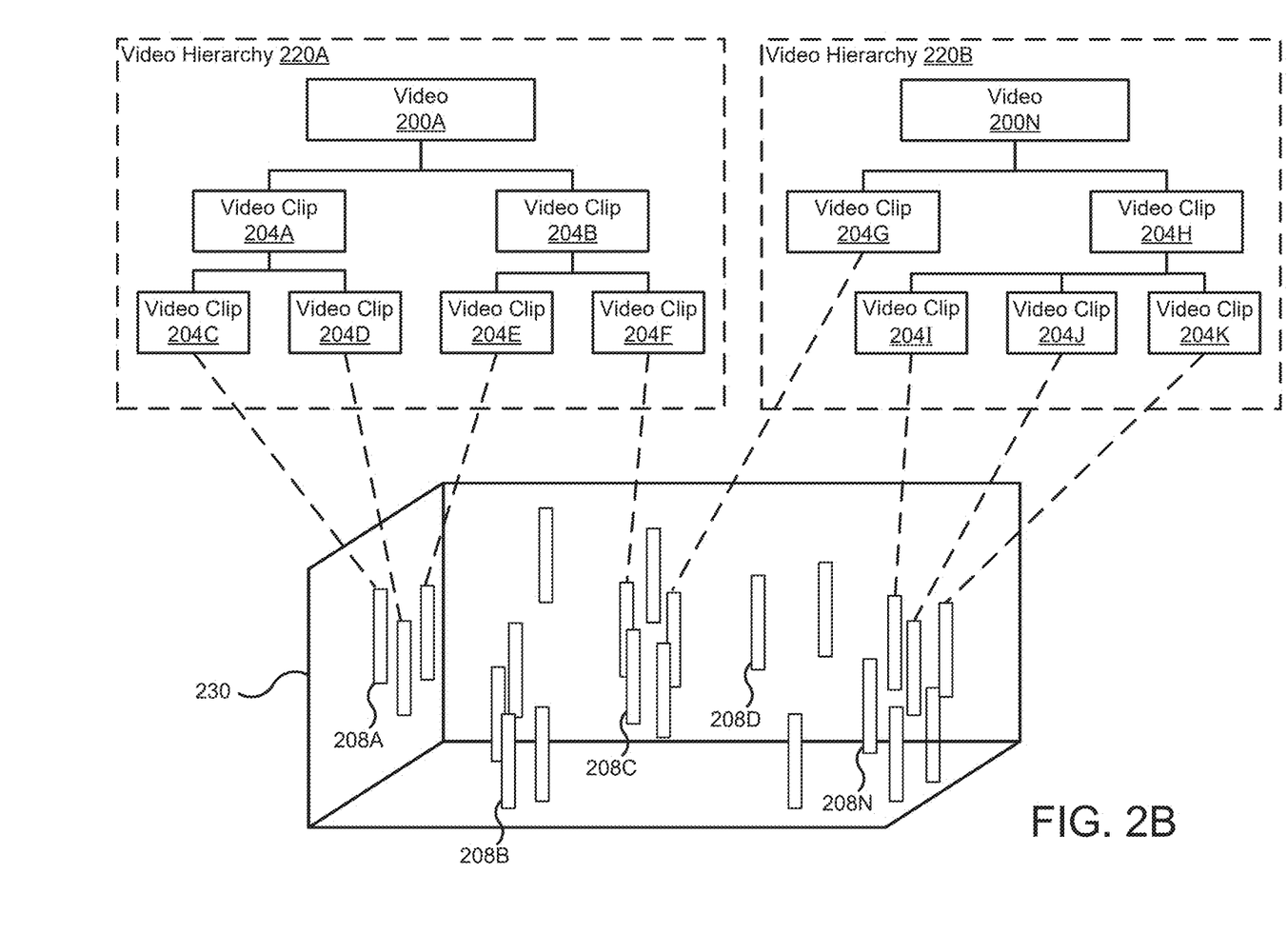
Figure 2C:
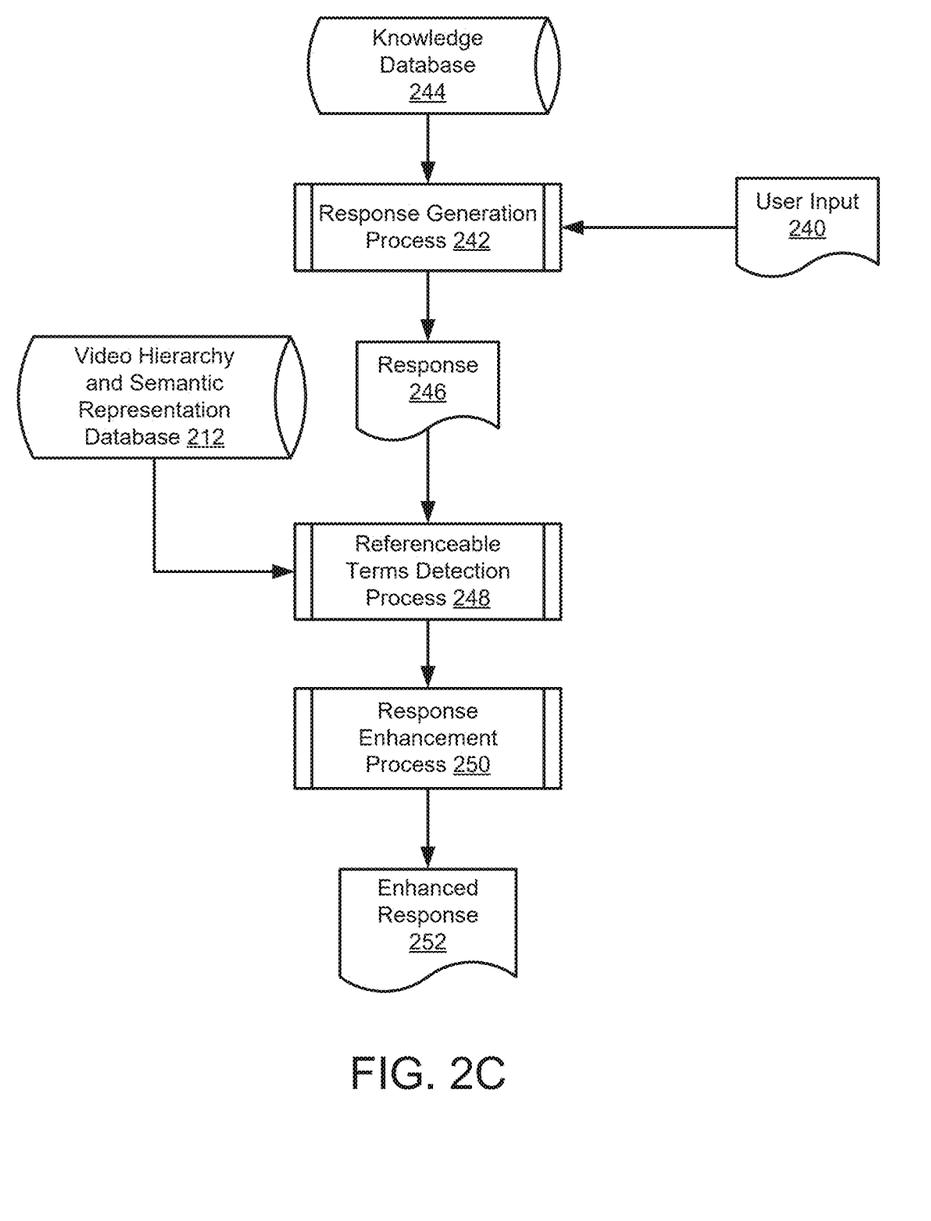

To further clarify embodiments disclosed herein, data flow diagrams and implementation examples in accordance with an embodiment are shown in FIGS. 2A-2C. In these diagrams (namely, in the data flow diagrams of FIGS. 2A and 2C), flows of data and processing of data are illustrated using different sets of shapes. A first set of shapes (e.g., 200A-200N, 204A-204N, 208A-208N, etc.) is used to represent data structures, a second set of shapes (e.g., 202, 206, 210 etc.) is used to represent processes performed using and/or that generate data, and a third set of shapes (e.g., 212, etc.) is used to represent large scale data structures such as databases.

While the data flow diagrams and implementation examples of FIGS. 2A-2C are not limited to the specific context of using tutorial videos for repairing/troubleshooting computing devices, to provide a more succinct and clear description, tutorial videos for repairing/troubleshooting computing devices will be used as the main example for the processes/methods described in these figures. As noted, the processes/methods in these figures may be used in the context of any type of videos for any type of interactive user assistance systems.

Turning to FIG. 2A, a first data flow diagram in accordance with one or more embodiments is shown. The first data flow diagram may illustrate a method/process for generating a hierarchically managed video clip pool of one or more embodiments disclosed herein.

As shown in FIG. 2A, one or more videos 200A-200N may be obtained. These videos 200A-200N may be obtained from any source (e.g., any of the data processing systems 100A-100N or user assistance manager 110 of FIG. 1, or from other computing devices/sources (e.g., a universal resource bus (USB) device, or the like)) not shown in FIG. 1). Each of these videos 200A-200N may also be of any size, duration (e.g., a full-length feature, clips of a full-length feature, or the like), quality, and format. In one example, each video 200A-200N may be a step-by-step tutorial for repairing/troubleshooting computing devices. More specifically, video 200A may be a video for CPU repair and/or replacement while video 200N may be a video for random access memory (RAM) installation and/or replacement.

In embodiments, the videos 200A-200N are provided to a hierarchical video clipping process 202 where the videos 200A-200N are clipped into one or more video clips 204A-204N.

The hierarchical video clipping process 202 may automatically (e.g., using one or more ML/AI techniques) or through manual intervention by one or more users (e.g., administrators, regular users, video owner, or the like) segment (e.g., clip) each of the videos 200A-200N into smaller video clips 204A-204N. Each of the initially generated clips may be further segmented into even smaller/shorter clips. For example, each video clip 204A-204G may correspond to a specific step or component of the CPU repair and/or replacement tutorial.

In embodiments, the criteria (e.g., rules, policies, definitions, or the like) for segmenting (e.g., clipping) the videos 200A-200N into the individual video clips 204A-204N may vary based on: the type(s) of the videos 200A-200N; the use for the videos 200A-200N; the goal(s) of the interactive user assistance system using the videos 200A-200N; and other similar/related factors. Said another way, the hierarchical video clipping process 202 may be configured to segment (e.g., clip) the videos 200A-200N into the video clips 204A-204N in any way, form, or manner, using any rules, criteria, policies, or the like without departing from the scope of embodiments disclosed herein.

After being segmented, a video hierarchy may be created (e.g., using hierarchical video clipping process 202) for each video 200A-200N. Example video hierarchies for video 200A and video 200N may be seen in the implementation example shown in FIG. 2B.

Turning now temporarily to FIG. 2B, as shown in FIG. 2B, a video hierarchy 220A is created for video 200A and a video hierarchy 220B is created for video 200N. Each of the video hierarchy 220A-220B may establish a hierarchical structure (e.g., in the form of a hierarchy tree, or the like) between the original video (e.g., 200A and 200N) and the video clips generated using the original video. Each layer of the hierarchy may be established based on a duration of each of the original video and the video clips.

For example, as shown in FIG. 2B, original video (e.g., video 200A) is at the top of the video hierarchy 220A and each layer of the video hierarchy 220A are organized based on how the video (or video clip) at a preceding hierarchical layer is segmented (e.g., clipped). Other forms of hierarchical structures and organization methods may also be used without departing from the scope of embodiments herein.

Said another may, each hierarchical structure (e.g., video hierarchy 220A and 220B) may be created for the original video and video clips to reflect their respective position and relationships among one another. In one example, each hierarchical structure may be represented as a tree structure, with the top level representing the original (entire) video and the bottom level representing the smallest units of the video (i.e., the furthest segmented ones of the video clips). Additionally, each video clip may be associated with its position within the original video and its adjacent video clips.

In embodiments, establishing and using the video hierarchy advantageously allows for more efficient location and association of videos (and/or video clips). In particular, each video (and/or video clip) may retain its original video segment affiliation and maintain connections with neighboring videos (and/or video clips), which advantageously facilitates seamless navigation and context preservation within the hierarchical structure. For example, video clip 204D will include data (e.g., information) indicating that it is segmented from video clip 204A and that it is part of two segments (e.g., 204C and 204D) that have been segmented from video clip 204A.

Turning back to FIG. 2A, such video hierarchy information (e.g., associated with video hierarchy 220A-220B of FIG. 2B) may be stored into a video hierarchy and semantic representation database 212 as part (e.g., a portion) of the hierarchically managed video clip pool of embodiments disclosed herein. In embodiments, the video hierarchy and semantic representation database 212 may be storage (e.g., physical and/or virtual) configured to store the hierarchically managed video clip pool.

Each of the generated video hierarch(ies) (video hierarchies 220A-220B of FIG. 2B) may be provided to multimodal content embedding process 206. In embodiments, multimodal content embedding process 206 may utilize one or more AI/ML (e.g., large-scale models, or the like) based multimodal content embedding techniques to extract content embeddings from each of the videos (e.g., the original videos) and video clips included in each of the video hierarchies.

For example, large-scale models (e.g., AI/ML models) may be leveraged to extract content embeddings from each of the videos 200A-200N and video clips 204A-204N, integrating textual elements (video subtitles or explanations) and image data into each of the videos 200A-200N and video clips 204A-204N. Additionally, by employing deep learning models (or the like) such as Bidirectional Encoder Representations from Transformers (BERT), Contrastive Language-Image Pre-training (CLIP), or the like, content (e.g., the video subtitles, explanations, or the like) may be embedded into each of the videos 200A-200N and video clips 204A-204N, creating a multimodal representation for a more comprehensive and intuitive user guidance experience.

The multimodal content embedding process 206 may be further configured to utilize such embedding techniques to generate semantic representations of each of the videos 200A-200N and video clips 204A-204N (e.g., video clip semantic representations 208A-208N). The generated semantic representations of each of the videos 200A-200N and video clips 204A-204N (e.g., video clip semantic representations 208A-208N) may then be provided to semantic embedding and associativity process 210 where the video clip semantic representations 208A-208N will be stored into the video hierarchy and semantic representation database 212 as another part (along with the video hierarchy data) of the hierarchically managed video clip pool of one or more embodiments.

In particular, semantic embedding and associativity process 210 may generate (e.g., create) a semantic vector space (example shown in FIG. 2B and discussed in more detail below) within video hierarchy and semantic representation database 212 to store the video clip semantic representations 208A-208N. The semantic vector space may be created in any way (e.g., through instructions received from a user, automatically using a combination of AI/ML techniques, or the like) without departing from the scope of embodiments disclosed herein.

In embodiments, the semantic vector space may include areas that are each associated with the one or more (e.g., a single or a combination of) referenceable terms. Each of the one or more referenceable terms may be linked to one or more keywords/phrases within the videos 200A-200N and video clips 204A-204N. For example, referenceable terms associated with video 200A (and its associated video clips) directed to CPU repair and/or replacement may include, for example, "accessing the CPU", "CPU", "uninstalling the CPU", "installing the CPU", or the like.

The one or more referenceable terms may be obtained/identified in any way (e.g., through being provided by a user, automatically using a combination of AI/ML techniques from analyzing the contents of the videos and video clips, or the like) without departing from the scope of embodiments disclosed.

In embodiments, each of the video clip semantic representations 208A-208N may be stored within an area of the semantic vector space that most closely relates to a content of each of the video clip semantic representations 208A-208N. In particular, turning back to the implementation example shown in FIG. 2B, an example semantic vector space 230 containing the video clip semantic representations 208A-208N is shown. In this example, the three (3) video clip semantic representations that are organized within a group with video clip semantic representation 208A may be stored in an area of the semantic vector space associated with the referenceable term "CPU" (or a combination of referenceable terms that include the term "CPU"). As another example, the three (3) video clip semantic representations that are respectively linked (e.g., via the broken lines) to video clips 2041-204K and that are organized in the general area with video clip semantic representation 208N may be stored in an area of the semantic vector space associated with the referenceable term "RAM" (or a combination of referenceable terms that include the term "RAM").

In this manner, when the interactive user assistance system detects the referenceable term "RAM" in a response generated to a user's input, the interactive user assistance system may search this semantic vector space to locate (e.g., find) the video (or video clip) that is the most relevant to the referenceable term "RAM". This will be discussed below in more detail with reference to FIG. 2C.

Turning back to FIG. 2A, the hierarchically managed video clip pool may be completed when both the video hierarchy data and the semantic vector space storing the video clip semantic representations 208A-208N are both stored (e.g., together, in association with one another, or the like) within the video hierarchy and semantic representation database 212.

By using the hierarchically managed video clip pool, users (e.g., via the interactive user assistance system of one or more embodiments) can retrieve the desired videos (and/or video clips) using keywords or queries (e.g., that correspond with the one or more referenceable terms). Semantic embedding and associativity techniques may be used to expedite the video (and/or video clip) retrieval process, ensuring users can quickly and accurately find the content that will best enhance the input they provided into the interactive user assistance system. This retrieval process may be optimized through the context of the hierarchical structure, ensuring coherence and logical relationships between adjacent videos (and/or video clips).

In embodiments, the steps and processes shown in the data flow diagram of FIG. 2A may be repeated each time a new (or an updated one of) video 200A-200N is provided. This advantageously provides a system that dynamically updates the hierarchically managed video clip pool stored in the video hierarchy and semantic representation database 212 whenever new and/or updated videos are provided.

Turning now to FIG. 2C, a second data flow diagram in accordance with one or more embodiments is shown. The second data flow diagram may illustrate a method/process for generating an enhanced response using the interactive user assistance system of one or more embodiments disclosed herein.

A user input 240 may be provided (alongside data stored in knowledge database 244) to a response generation process 242 to generate a response 246. The user input 240 may be received in any form and length (e.g., a statement, a question, a random string or combination of words, or the like). The user input 240 may be input to a graphical user interface (GUI) of an application associated with the interactive user assistance system.

Knowledge database 244 may contain any type and form of data compiled and organized by one or more users (e.g., administrators) of the interactive user assistance system. The response generation process 242 may automatically (e.g., using AI/ML techniques such as a combination of LLM based content generation techniques using RAG framework, or the like) generate the response 246 using data from the knowledge database 244 and the user input.

For example, assume that the user input 240 is "My machine is experiencing issues and reports errors related to the CPU and hard drive. I would like to know how to check." The response 246 generated via response generation process 242 may look like: "When your machine reports issues with the CPU or hard drive, you can follow these steps:
1. [Accessing the CPU]: First, open the computer casing and locate the CPU socket on the motherboard. Gently press the release button near the CPU socket to unlock it, carefully remove the CPU for inspection. Ensure that the CPU socket is free from dust or debris and reinstall the CPU correctly.
2. [Accessing the Hard Drive]: Open the computer casing and locate the position of the hard drive. Remove the hard drive by unscrewing the fixing screws. Check if the hard drive connection cables are loose or damaged, and replace them if necessary. Reinsert the hard drive and secure the screws.
3. [Replacing the Hard Drive]: If you find issues with the hard drive during inspection, it may be necessary to replace it. Ensure to back up important data and then proceed with the hard drive replacement process."

The response 246 generated using response generation process 242 may be provided (along with data from the video hierarchy and semantic representation database 212) to referenceable terms detection process 248 where one or more referenceable terms (as discussed above in reference to FIG. 2A) within the response 246 may be detected (e.g., identified). After identifying the referenceable term(s) in the response 246, the referenceable terms detection process 248 may look to the data (e.g., the hierarchically managed video clip pool) stored in the video hierarchy and semantic representation database 212 to search for videos (and/or video clips) associated with these reference term(s).

For example, assume that "CPU" is a detected referenceable term. The referenceable terms detection process 248 may then search the semantic vector space stored in the video hierarchy and semantic representation database 212 to find a video (or a video clip) that is the most closely related (e.g., associated with) the term "CPU" within the semantic vector space. Alternatively, multiple videos (and/or video clips) within a predetermined similarity/relevance threshold to the term "CPU" within the semantic vector space may be identified.

The identified videos (and/or video clips) may be provided to response enhancement process 250 (along with response 246) where the response 246 may be altered (e.g., enhanced) to include one or more ways (e.g., hyperlinks, or the like) to access the identified videos (and/or video clips). The response 246 that has been enhanced by the access to the identified videos (and/or video clips) may be provided (e.g., by the interactive user assistance system) to the user (e.g., via a computing device display showing the GUI) as an enhanced response 252.

Referring back to the example response 246 presented earlier, the example response 246 may be enhanced by making the terms "Accessing the CPU", "Accessing the Hard Drive", and "Replacing the Hard Drive" as hyperlinks to one or more of the videos (and/or video clips). Because each video (and/or video clip) still retains its video segment affiliation to its original video and segmented video clips, the user may seamlessly navigate through all of the video clips of a segmented video after accessing an original video and/or one of the video clips segmented from the original video.

Said another way, upon detecting that the user has accessed an original video or a video clip using a hyperlink, the interactive user assistance system of embodiments disclosed herein may provide the user with information (e.g., through use of additional links and/or other navigation tools) regarding the video hierarchy of the original video or the video clip to grant the user seamless access to any ones of the original video or video clips within that video hierarchy.

In embodiments, interactive user assistance system may be configured to receive user feedback with respect to the enhanced response 252. The interactive user assistance system may use such feedback to generate new (and further improved) enhanced responses. For example, assume that the user's feedback includes the terms "only link me to videos or video clips shorter than two (2) minutes", the interactive user assistance system may repeat the processes shown in the data flow diagram of FIG. 2C with the extra limitation set by the user via the user feedback to provide a new enhanced response with links to only videos or video clips that are shorter than two (2) minutes. Other types of user feedback may be provided and the interactive user assistance system may automatically adapt to such feedback without departing from the scope of embodiments disclosed herein.

Any of the processes illustrated using the second set of shapes may be performed, in part or whole, by digital processors (e.g., central processors, processor cores, etc.) that execute corresponding instructions (e.g., computer code/software) of any of the data processing systems 100A-100N and/or of the user assistance manager 110 of FIG. 1. Execution of the instructions may cause the digital processors to initiate performance of the processes. Any portions of the processes may be performed by the digital processors and/or other devices. For example, executing the instructions may cause the digital processors to perform actions that directly contribute to performance of the processes, and/or indirectly contribute to performance of the processes by causing (e.g., initiating) other hardware components to perform actions that directly contribute to the performance of the processes.

Any of the processes illustrated using the second set of shapes may be performed, in part or whole, by special purpose hardware components such as digital signal processors, application specific integrated circuits, programmable gate arrays, graphics processing units, data processing units, and/or other types of hardware components. These special purpose hardware components may include circuitry and/or semiconductor devices adapted to perform the processes. For example, any of the special purpose hardware components may be implemented using complementary metal-oxide semiconductor based devices (e.g., computer chips).

Any of the data structures illustrated using the first and third set of shapes may be implemented using any type and number of data structures. Additionally, while described as including particular information, it will be appreciated that any of the data structures may include additional, less, and/or different information from that described above. The informational content of any of the data structures may be divided across any number of data structures, may be integrated with other types of information, and/or may be stored in any location.

Figure 3A:
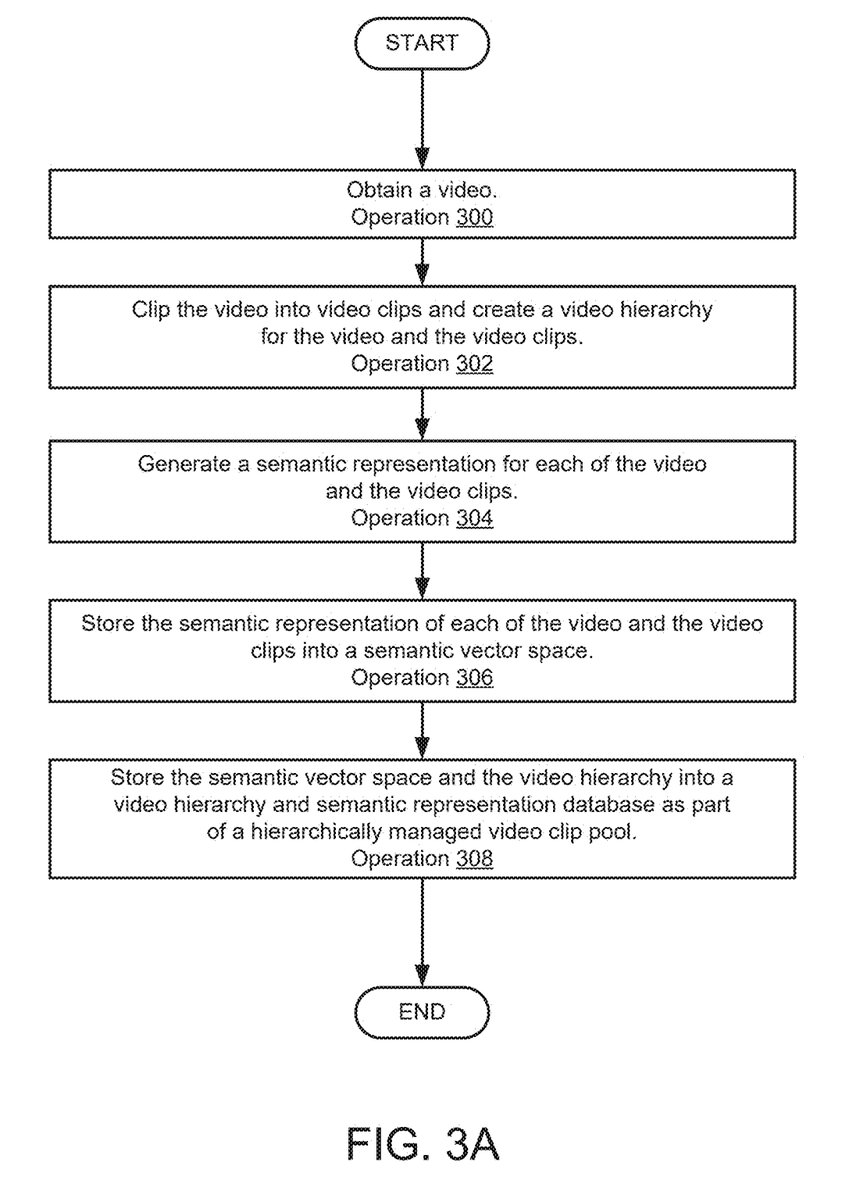
FIGS. 3A-3B show flow diagrams in accordance with one or more embodiments.
Figure 3B:
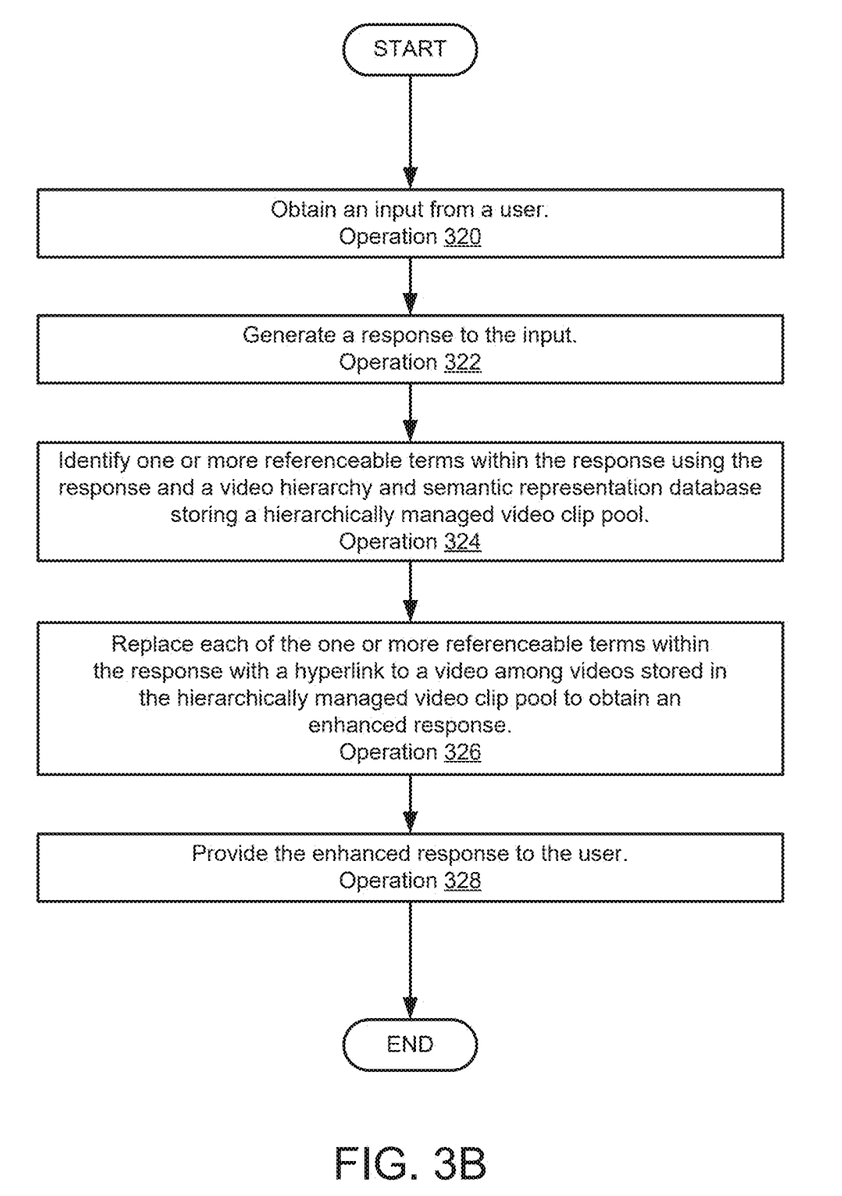

As discussed above, the components of FIG. 1 may perform various methods to manage and orchestrate backend components. FIGS. 3A-3B illustrate flow charts of methods that may be performed by the components of the system of FIG. 1 in accordance with an embodiment. In the diagrams discussed below and shown in FIGS. 3A-3B, any of the operations may be repeated, performed in different orders, and/or performed in parallel with or in a partially overlapping in time manner with other operations.

Turning to FIG. 3A a first flow diagram illustrating a method for managing an interactive user assistance system that provides a rich multimodal content experience for a user is shown. The method may be performed, for example, by any of the components of the system of FIG. 1, and/or other components not shown therein.

At operation 300, as discussed above in reference to FIG. 2A, a video may be obtained (e.g., for setting up and/or updating a hierarchically managed video clip pool stored in a video hierarchy and semantic representation database).

At operation 302, as discussed above in reference to FIGS. 2A-2B (namely, as part of the description of hierarchical video clipping process 202 of FIG. 2A), the video may be clipped into video clips and a video hierarchy for the video and the video clips may be created (and stored into the video hierarchy and semantic representation database (e.g., 212 of FIG. 2A)).

At operation 304, as discussed above in reference to FIG. 2A (namely, as part of the description of the multimodal content embedding process of FIG. 2A), a semantic representation may be generated for each of the video and video clips.

At operation 306, as discussed above in reference to FIGS. 2A and 2B (namely, as part of the description of the semantic embedding and associativity process 210 of FIG. 2A), the semantic representation of each of the video and the video clips may be stored in a semantic vector space (e.g., 230, FIG. 2B).

At operation 308, as discussed above in reference to FIG. 2A, the semantic vector space and the video hierarchy may be stored into a video hierarchy and semantic representation database as part of a hierarchically managed video clip pool.

The process of FIG. 3A may end following operation 308.

Turning now to FIG. 3B, a second flow diagram illustrating a method for managing an interactive user assistance system that provides a rich multimodal content experience for a user is shown. The method may be performed, for example, by any of the components of the system of FIG. 1, and/or other components not shown therein.

At operation 320, as discussed above in reference to FIG. 2C, an input may be obtained from a user. In embodiments, the input may comprise a question. The question may be associated with an error of a data processing system (e.g., any of the data processing systems 100A-100N and the user assistance manager 110 of FIG. 1).

At operation 322, as discussed above in reference to FIG. 2C (namely, as part of the description of the response generation process 242 of FIG. 2C), a response to the input may be generated.

At operation 324, as discussed above in reference to FIG. 2C (namely, as part of the referenceable terms detection process 248 of FIG. 2C), one or more referenceable terms within the response may be identified using the response and a video hierarchy and semantic representation database storing a hierarchically managed video clip pool. The identified referenceable terms may then be used (in conjunction with the hierarchically managed video clip pool) to identify/select one or more video and/or video clips that may be used to enhance the response.

In embodiments, the identified video and/or video clips may include content for assistance the user to resolve the question included in the input. The content may include step-by-step tutorials for resolving the error of the data processing system.

At operation 326, as discussed above in reference to FIG. 2C (namely, as part of the referenceable terms detection process 248 and response enhancement process 250 of FIG. 2C), each of the one or more referenceable terms within the response with a hyperlink to a video among videos stored in the hierarchically managed video clip pool to obtain an enhanced response (e.g., 252, FIG. 2C).

At operation 328, as discussed above in reference to FIG. 2C, the enhanced response may be provided to the user.

The process of FIG. 3B may end following operation 328.

Figure 4:
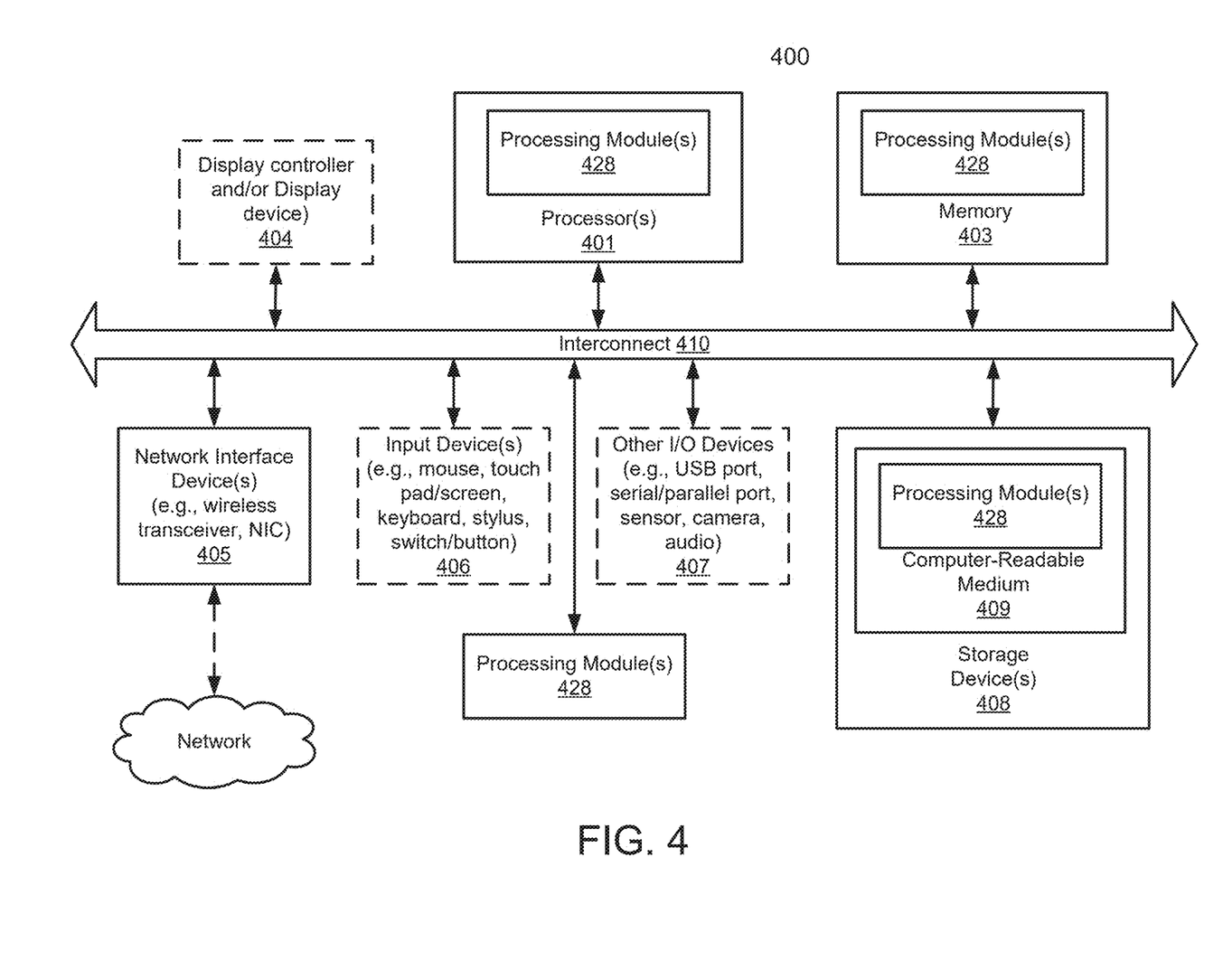
FIG. 4 shows a block diagram illustrating a data processing system in accordance with one or more embodiments.

Any of the components illustrated in FIGS. 1-3B may be implemented with one or more computing devices. Turning to FIG. 4, a block diagram illustrating an example of a data processing system (e.g., a computing device) in accordance with an embodiment is shown. For example, system 400 may represent any of data processing systems described above performing any of the processes or methods described above. System 400 can include many different components. These components can be implemented as integrated circuits (ICs), portions thereof, discrete electronic devices, or other modules adapted to a circuit board such as a motherboard or add-in card of the computer system, or as components otherwise incorporated within a chassis of the computer system. Note also that system 400 is intended to show a high-level view of many components of the computer system. However, it is to be understood that additional components may be present in certain implementations and furthermore, different arrangement of the components shown may occur in other implementations.

System 400 may represent a desktop, a laptop, a tablet, a server, a mobile phone, a media player, a personal digital assistant (PDA), a personal communicator, a gaming device, a network router or hub, a wireless access point (AP) or repeater, a set-top box, or a combination thereof. Further, while only a single machine or system is illustrated, the term "machine" or "system" shall also be taken to include any collection of machines or systems that individually or jointly execute a set (or multiple sets) of instructions to perform any one or more of the methodologies discussed herein.

In one embodiment, system 400 includes processor 401, memory 403, and devices 405-408 via a bus or an interconnect 410. Processor 401 may represent a single processor or multiple processors with a single processor core or multiple processor cores included therein. Processor 401 may represent one or more general-purpose processors such as a microprocessor, a central processing unit (CPU), or the like. More particularly, processor 401 may be a complex instruction set computing (CISC) microprocessor, reduced instruction set computing (RISC) microprocessor, very long instruction word (VLIW) microprocessor, or processor implementing other instruction sets, or processors implementing a combination of instruction sets.

Processor 401 may also be one or more special-purpose processors such as an application specific integrated circuit (ASIC), a cellular or baseband processor, a field programmable gate array (FPGA), a digital signal processor (DSP), a network processor, a graphics processor, a network processor, a communications processor, a cryptographic processor, a co-processor, an embedded processor, or any other type of logic capable of processing instructions.

Processor 401, which may be a low power multi-core processor socket such as an ultra-low voltage processor, may act as a main processing unit and central hub for communication with the various components of the system. Such processor can be implemented as a system on chip (SoC). Processor 401 is configured to execute instructions for performing the operations discussed herein. System 400 may further include a graphics interface that communicates with optional graphics subsystem 404, which may include a display controller, a graphics processor, and/or a display device.

Processor 401 may communicate with memory 403, which in one embodiment can be implemented via multiple memory devices to provide for a given amount of system memory. Memory 403 may include one or more volatile storage (or memory) devices such as random-access memory (RAM), dynamic RAM (DRAM), synchronous DRAM (SDRAM), static RAM (SRAM), or other types of storage devices. Memory 403 may store information including sequences of instructions that are executed by processor 401, or any other device.

For example, executable code and/or data of a variety of operating systems, device drivers, firmware (e.g., input output basic system or BIOS), and/or applications can be loaded in memory 403 and executed by processor 401. An operating system can be any kind of operating systems, such as, for example, Windows® operating system from Microsoft®, Mac OS®/iOS® from Apple, Android® from Google®, Linux®, Unix®, or other real-time or embedded operating systems such as VxWorks.

System 400 may further include IO devices such as devices (e.g., 405, 406, 407, 408) including network interface device(s) 405, optional input device(s) 406, and other optional IO device(s) 407. Network interface device(s) 405 may include a wireless transceiver and/or a network interface card (NIC). The wireless transceiver may be a WiFi transceiver, an infrared transceiver, a Bluetooth transceiver, a WiMAX transceiver, a wireless cellular telephony transceiver, a satellite transceiver (e.g., a global positioning system (GPS) transceiver), or other radio frequency (RF) transceivers, or a combination thereof. The NIC may be an Ethernet card.

Input device(s) 406 may include a mouse, a touch pad, a touch sensitive screen (which may be integrated with a display device of optional graphics subsystem 404), a pointer device such as a stylus, and/or a keyboard (e.g., physical keyboard or a virtual keyboard displayed as part of a touch sensitive screen). For example, input device(s) 406 may include a touch screen controller coupled to a touch screen. The touch screen and touch screen controller can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch screen.

IO devices 407 may include an audio device. An audio device may include a speaker and/or a microphone to facilitate voice-enabled functions, such as voice recognition, voice replication, digital recording, and/or telephony functions. Other IO devices 407 may further include universal serial bus (USB) port(s), parallel port(s), serial port(s), a printer, a network interface, a bus bridge (e.g., a PCI-PCI bridge), sensor(s) (e.g., a motion sensor such as an accelerometer, gyroscope, a magnetometer, a light sensor, compass, a proximity sensor, etc.), or a combination thereof. IO device(s) 407 may further include an imaging processing subsystem (e.g., a camera), which may include an optical sensor, such as a charged coupled device (CCD) or a complementary metal-oxide semiconductor (CMOS) optical sensor, utilized to facilitate camera functions, such as recording photographs and video clips. Certain sensors may be coupled to interconnect 410 via a sensor hub (not shown), while other devices such as a keyboard or thermal sensor may be controlled by an embedded controller (not shown), dependent upon the specific configuration or design of system 400.

To provide for persistent storage of information such as data, applications, one or more operating systems and so forth, a mass storage (not shown) may also couple to processor 401. In various embodiments, to enable a thinner and lighter system design as well as to improve system responsiveness, this mass storage may be implemented via a solid-state device (SSD). However, in other embodiments, the mass storage may primarily be implemented using a hard disk drive (HDD) with a smaller amount of SSD storage to act as an SSD cache to enable non-volatile storage of context state and other such information during power down events so that a fast power up can occur on re-initiation of system activities. Also, a flash device may be coupled to processor 401, e.g., via a serial peripheral interface (SPI). This flash device may provide for non-volatile storage of system software, including a basic input/output software (BIOS) as well as other firmware of the system.

Storage device 408 may include computer-readable storage medium 409 (also known as a machine-readable storage medium or a computer-readable medium) on which is stored one or more sets of instructions or software (e.g., processing module, unit, and/or processing module/unit/logic 428) embodying any one or more of the methodologies or functions described herein. Processing module/unit/logic 428 may represent any of the components described above. Processing module/unit/logic 428 may also reside, completely or at least partially, within memory 403 and/or within processor 401 during execution thereof by system 400, memory 403 and processor 401 also constituting machine-accessible storage media. Processing module/unit/logic 428 may further be transmitted or received over a network via network interface device(s) 405.

Computer-readable storage medium 409 may also be used to store some software functionalities described above persistently. While computer-readable storage medium 409 is shown in an exemplary embodiment to be a single medium, the term "computer-readable storage medium" should be taken to include a single medium or multiple media (e.g., a centralized or distributed database, and/or associated caches and servers) that store the one or more sets of instructions. The terms "computer-readable storage medium" shall also be taken to include any medium that is capable of storing or encoding a set of instructions for execution by the machine and that cause the machine to perform any one or more of the methodologies of embodiments disclosed herein. The term "computer-readable storage medium" shall accordingly be taken to include, but not be limited to, solid-state memories, and optical and magnetic media, or any other non-transitory machine-readable medium.

Processing module/unit/logic 428, components and other features described herein can be implemented as discrete hardware components or integrated in the functionality of hardware components such as ASICS, FPGAs, DSPs or similar devices. In addition, processing module/unit/logic 428 can be implemented as firmware or functional circuitry within hardware devices. Further, processing module/unit/logic 428 can be implemented in any combination hardware devices and software components.

Note that while system 400 is illustrated with various components of a data processing system, it is not intended to represent any particular architecture or manner of interconnecting the components; as such details are not germane to embodiments disclosed herein. It will also be appreciated that network computers, handheld computers, mobile phones, servers, and/or other data processing systems which have fewer components, or perhaps more components may also be used with embodiments disclosed herein.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments disclosed herein also relate to an apparatus for performing the operations herein. Such a computer program is stored in a non-transitory computer readable medium. A non-transitory machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g., circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments disclosed herein are not described with reference to any particular programming language. It will be appreciated that a variety of programming languages may be used to implement the teachings of embodiments disclosed herein.

In the foregoing specification, embodiments have been described with reference to specific exemplary embodiments thereof. It will be evident that various modifications may be made thereto without departing from the broader spirit and scope of the embodiments disclosed herein as set forth in the following claims. The specification and drawings are, accordingly, to be regarded in an illustrative sense rather than a restrictive sense.

What is claimed is:

1. A method for managing an interactive user assistance system that provides a rich multimodal content experience for a user, the method comprising:
   obtaining an input from the user;
   generating a response to the input using one or more machine learning models;
   identifying one or more referenceable terms within the response using the response and a video hierarchy and semantic representation database, the video hierarchy and semantic representation database that comprises a semantic vector space in which a plurality of semantic representations of video clips of videos are stored and a hierarchically managed video clip pool, the hierarchically managed video clip pool comprises, for a first video among the videos:
      first video clips clipped from the first video;
      a first video hierarchy, of one or more video hierarchies that indicate a hierarchical association between each of the videos and video clips of the videos, created for the first video and the first video clips;
      a semantic representation, of the plurality of semantic representations, generated for each of the first video and the first video clips,
      wherein the semantic representation of each of the first video and the first video clips are stored into the semantic vector space, the semantic vector space and information associated with the first video hierarchy are stored into the video hierarchy and semantic representation database as part of the hierarchically managed video clip pool, and the semantic vector space comprises areas associated with each of the one or more referenceable terms, and the semantic representation of each of the first video and the first video clips are stored in respective ones of the areas of the semantic vector space based on a level of similarity between the semantic representation and the one or more referenceable terms;
   replacing, using the level of similarity, each of the one or more referenceable terms within the response with a hyperlink to a video, among the videos stored in the hierarchically managed video clip pool, to obtain an enhanced response; and
   providing the enhanced response to the user.

2. The method of claim 1, wherein the one or more machine learning models comprise a large language model (LLM) utilizing a retrieval-augmented generation (RAG) framework.

3. The method of claim 1, wherein the semantic representation of each of the first video and the first video clips are generated using multimodal content embedding techniques.

4. The method of claim 1, wherein
the video associated with the hyperlink in the enhanced response is one of the first video or the first video clips, and
upon detecting that the user has accessed the first video or the first video clips using the hyperlink, providing the user with information regarding the first video hierarchy to grant the user access to any ones of the first video and the first video clips within the first video hierarchy.

5. The method of claim 1, wherein the input comprises a question and the video comprises content for assisting the user resolve the question.

6. The method of claim 5, wherein the question is associated with an error of a data processing system, and the content comprises step-by-step tutorials for resolving the error.

7. A non-transitory machine-readable medium having instructions stored therein, which when executed by a processor, cause the processor to perform operations for managing an interactive user assistance system that provides a rich multimodal content experience for a user, the operations comprising:
obtaining an input from the user;
generating a response to the input using one or more machine learning models;
identifying one or more referenceable terms within the response using the response and a video hierarchy and semantic representation database, the video hierarchy and semantic representation database that comprises a semantic vector space in which a plurality of semantic representations of video clips of videos are stored and a hierarchically managed video clip pool, the hierarchically managed video clip pool comprises, for a first video among the videos:
first video clips clipped from the first video;
a first video hierarchy, of one or more video hierarchies that indicate a hierarchical association between each of the videos and video clips of the videos, created for the first video and the first video clips;
a semantic representation, of the plurality of semantic representations, generated for each of the first video and the first video clips,
wherein the semantic representation of each of the first video and the first video clips are stored into the semantic vector space, the semantic vector space and information associated with the first video hierarchy are stored into the video hierarchy and semantic representation database as part of the hierarchically managed video clip pool, and the semantic vector space comprises areas associated with each of the one or more referenceable terms, and the semantic representation of each of the first video and the first video clips are stored in respective ones of the areas of the semantic vector space based on a level of similarity between the semantic representation and the one or more referenceable terms;
replacing, using the level of similarity, each of the one or more referenceable terms within the response with a hyperlink to a video, among the videos stored in the hierarchically managed video clip pool, to obtain an enhanced response; and
providing the enhanced response to the user.

8. The non-transitory machine-readable medium of claim 7, wherein the one or more machine learning models comprise a large language model (LLM).

9. The non-transitory machine-readable medium of claim 8, wherein the LLM utilizes a retrieval-augmented generation (RAG) framework.

10. The non-transitory machine-readable medium of claim 7, wherein the semantic representation of each of the first video and the first video clips are generated using multimodal content embedding techniques.

11. The non-transitory machine-readable medium of claim 7, wherein
the video associated with the hyperlink in the enhanced response is one of the first video or the first video clips, and
upon detecting that the user has accessed the first video or the first video clips using the hyperlink, providing the user with information regarding the first video hierarchy to grant the user access to any ones of the first video and the first video clips within the first video hierarchy.

12. The non-transitory machine-readable medium of claim 7, wherein the input comprises a question and the video comprises content for assisting the user resolve the question.

13. The non-transitory machine-readable medium of claim 12, wherein the question is associated with an error of a data processing system, and the content comprises step-by-step tutorials for resolving the error.

14. A user assistance manager, comprising:
a processor; and
a memory coupled to the processor to store instructions, which when executed by the processor, cause the processor to perform operations for managing an interactive user assistance system that provides a rich multimodal content experience for a user, the operations comprising:
obtaining an input from the user;
generating a response to the input using one or more machine learning models;
identifying one or more referenceable terms within the response using the response and a video hierarchy and semantic representation database, the video hierarchy and semantic representation database that comprises a semantic vector space in which a plurality of semantic representations of video clips of videos are stored and a hierarchically managed video clip pool, the hierarchically managed video clip pool comprises, for a first video among the videos:
first video clips clipped from the first video;
a first video hierarchy, of one or more video hierarchies that indicate a hierarchical association between each of the videos and video clips of the videos, created for the first video and the first video clips;
a semantic representation, of the plurality of semantic representations, generated for each of the first video and the first video clips,
wherein the semantic representation of each of the first video and the first video clips are stored into the semantic vector space, the semantic vector space and information associated with the first video hierarchy are stored into the video hierarchy and semantic representation database as part of the hierarchically managed video clip pool, and the semantic vector space comprises areas associated with each of the one or more referenceable terms, and the semantic representation of each of the first video and the first video clips are stored in respective ones of the areas of the semantic vector space based on a level of similarity between the semantic representation and the one or more referenceable terms;

replacing, using the level of similarity, each of the one or more referenceable terms within the response with a hyperlink to a video, among the videos stored in the hierarchically managed video clip pool, to obtain an enhanced response; and providing the enhanced response to the user.

15. The user assistance manager of claim 14, wherein the semantic representation of each of the first video and the first video clips are generated using multimodal content embedding techniques.

16. The user assistance manager of claim 14, wherein the one or more machine learning models comprise a large language model (LLM).

17. The user assistance manager of claim 16, wherein the LLM utilizes a retrieval-augmented generation (RAG) framework.

18. The user assistance manager of claim 14, wherein
the video associated with the hyperlink in the enhanced response is one of the first video or the first video clips, and upon detecting that the user has accessed the first video or the first video clips using the hyperlink, providing the user with information regarding the first video hierarchy to grant the user access to any ones of the first video and the first video clips within the first video hierarchy.

19. The user assistance manager of claim 14, wherein the input comprises a question and the video comprises content for assisting the user resolve the question.

20. The user assistance manager of claim 19, wherein the question is associated with an error of a data processing system, and the content comprises step-by-step tutorials for resolving the error.

\* \* \* \* \*